United States Patent
Velde et al.

(10) Patent No.: US 9,307,468 B2
(45) Date of Patent: *Apr. 5, 2016

(54) COMMUNICATION SYSTEM AND METHOD

(71) Applicant: Samsung Electronics Co., Ltd., Gyeonggi-do (KR)

(72) Inventors: Himke Van Der Velde, Zwolle (NL); Gert-Jan Van Lieshout, Apeldoorn (NL); Kyeongin Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 168 days.

This patent is subject to a terminal disclaimer.

(21) Appl. No.: 13/891,879

(22) Filed: May 10, 2013

(65) Prior Publication Data

US 2014/0161100 A1 Jun. 12, 2014

Related U.S. Application Data

(63) Continuation of application No. 12/809,888, filed as application No. PCT/KR2008/007384 on Dec. 12, 2008, now abandoned.

(30) Foreign Application Priority Data

Dec. 20, 2007 (GB) .................................. 0724833.9

(51) Int. Cl.
*H04W 36/00* (2009.01)
*H04W 36/16* (2009.01)
(Continued)

(52) U.S. Cl.
CPC ........ *H04W 36/165* (2013.01); *H04W 36/0072* (2013.01); *H04W 56/00* (2013.01); *H04W 36/14* (2013.01); *H04W 48/10* (2013.01); *H04W 92/10* (2013.01)

(58) Field of Classification Search
CPC . H04W 24/10; H04W 36/0061; H04W 48/12; H04W 72/0413; H04W 36/14; H04W 56/00; H04W 72/12; H04W 56/001; H04W 36/0088; H04W 36/026; H04W 68/02; H04W 72/04; H04W 72/042; H04W 36/00
USPC .......................................................... 455/436
See application file for complete search history.

(56) References Cited

U.S. PATENT DOCUMENTS 6,567,376 B1 5/2003 Karlsson et al.
6,839,565 B2 1/2005 Sarkkinen et al.
(Continued)

FOREIGN PATENT DOCUMENTS

WO WO 2007/075559 7/2007
WO WO 2009/082111 7/2009

OTHER PUBLICATIONS

United Kingdom Search Report dated Apr. 22, 2008 issued in counterpart application No. GB0724833.9.

*Primary Examiner* — Kwasi Karikari
(74) *Attorney, Agent, or Firm* — The Farrell Law Firm, P.C.

(57) ABSTRACT

A communication system that includes mobile user equipment and a communication network is provided. The communication network includes a first base station communicating with the user equipment according to a first defined radio frame format with a first sequence of radio frames each having the same length and each being allocated a respective first System Frame Number (SFN) to sequentially number the radio frames of the first sequence. A second base station is provided to communicate with the user equipment according to a second defined radio frame format including a second sequence of radio frames each having the same length and each being allocated a respective second SFN such that the radio frames of the second sequence are sequentially numbered. A radio signal includes first information indicative of a difference between the first and second SFNs at a particular time and second information usable with the first information.

16 Claims, 10 Drawing Sheets

(51) Int. Cl.
*H04W 56/00* (2009.01)
*H04W 36/14* (2009.01)
*H04W 48/10* (2009.01)
*H04W 92/10* (2009.01)

(56) References Cited

U.S. PATENT DOCUMENTS

| | | | |
|---|---|---|---|
| 7,047,011 | B1 | 5/2006 | Wikman |
| 7,983,215 | B2 | 7/2011 | Choi et al. |
| 2002/0085556 | A1 | 7/2002 | Hong |
| 2004/0008646 | A1* | 1/2004 | Park ............... H04B 7/2643 370/331 |
| 2004/0047333 | A1* | 3/2004 | Han ............... H04B 1/7117 370/350 |
| 2004/0202124 | A1 | 10/2004 | Dick et al. |
| 2005/0043046 | A1* | 2/2005 | Lee ............... H04W 36/0072 455/502 |
| 2007/0135149 | A1* | 6/2007 | Sung et al. ............ 455/502 |
| 2007/0149206 | A1 | 6/2007 | Wang et al. |
| 2007/0213059 | A1 | 9/2007 | Shaheen |

\* cited by examiner

COMMUNICATION SYSTEM AND METHOD

TECHNICAL FIELD

The present invention relates to communication systems and methods in which mobile user equipment (such as a mobile telephone, personal digital assistant (PDA) or other device) communicates with base stations of a communication network using radio signals in accordance with defined radio frame formats. Certain embodiments of the invention are concerned in particular with communication methods and systems in which user equipment communicates with a Universal Terrestrial Radio Access (UTRA) Network (also known as UTRAN, or UMTS Terrestrial Radio Access Network) or an Evolved Universal Terrestrial Radio Access (E-UTRA) Network (or E-UTRAN).

BACKGROUND ART

A variety of communication networks comprising a plurality of base stations with which mobile, portable user equipment can communicate, using radio signals, are known. They include, for example, the GSM network, and the 3rd Generation (3G) network (UTRAN). These networks are typically arranged to provide connectivity between the mobile user equipment (UE) and a core network, such that the user equipment can communicate with other user equipment or indeed other devices at different locations. These communication networks may also be referred to as cellular networks, with different base stations being arranged to provide network coverage (i.e. provide radio communication with the UE) in different areas, known as cells. The coverage of adjacent base stations is typically arranged to overlap, so that there is no loss in network connection as UE moves from one area to another. Clearly, as UE moves within the area covered by such a network it may become necessary for communication that was previously with one base station to be handed over to another base station. The term "base station" in this specification is being used in a broad sense; it is not intended to be limited to the radio transceivers of any particular communications network. It simply refers to a station (or device) of the network which is arranged to transmit radio signals to, and receive radio signals from the UE and so provide connection between the UE and the networks. The base station may also be referred to as a radio transceiver, and base stations include, for example, the base stations of the type used in GSM systems, and the base stations of the UTRA and E-UTRA networks, which are commonly referred to as node Bs (NBs) and enhanced-node Bs (eNBs) respectively.

In certain communications systems, for example those using UTRA or E-UTRA networks, the communication between the user equipment and the base station in a particular area or cell is by radio signals in (i.e. according to) a predefined radio frame format, that format comprising a sequence of radio frames, each having the same length, and the frames of the sequence being numbered sequentially with a System Frame Number (SFN). The frames typically have a defined structure, and this structure may vary with SFN. In such systems, for the UE to be able to communicate with a particular base station it needs to synchronise with the radio frame format being used by that base station, so that, for example, when the UE sends a radio signal to the base station it does so in an appropriate time slot according to the frame format. Typically, the UE will perform this synchronisation using signals received from the base station; it can detect frame edges/boundaries, and will read SFN numbering information from signals received from the base station, together with reading other information required for communication with the base station, such as information regarding the particular frame format (including frame structure—i.e. structure at the sub-frame level). In certain systems, and again for example those using the UTRA and E-UTRA networks, the radio frame formats of different base stations are, in general, not synchronised with each other. Furthermore, although the frame lengths (i.e. durations) are typically the same, the frame structures of different base stations may be different (with structure varying with SFN in one format, and remaining the same, or varying in a different way with SFN in the different format of an adjacent base station or cell). The SFN may also be required by the UE for other purposes (i.e. other than to determine frame format) in order for the UE to communicate with the base station (for example by sending a RACH transmission). For example, a resource or resources allocated to the UE may be expressed in relation to the SFN (i.e. the resource may apply in some of the radio frames, but not others). In certain radio frames, the UE may not be required to receive any signals, and so it may go into sleep mode to conserve battery power. Thus, for a variety of reasons, the UE may require a knowledge of at least one or more least significant bits of the SFN (when expressed in binary form), or indeed the whole SFN, in order to operate appropriately when in communication with a base station.

Thus, in general, in a system using the UTRA or E-UTRA networks, at a particular time the current frames of two different base stations will have different SFNs, and the frame boundaries will be occurring at different times (i.e. the beginning of a frame in one format will occur at a different time to that of a frame in the second format). Clearly, this lack of synchronisation between base station's frame formats poses problems for handover of communications; the UE will be synchronised with the frame format of the base station with which it is currently communicating (the source base station), but cannot communicate with the target base station until it can synchronise with the frame format of that target.

In more detail, before handover, the UE normally measures the target cell. If this target cell becomes a good candidate, or indeed the best candidate, the UE reports this to the network (via the source cell, i.e. the current cell in which the UE is communicating with a respective base station). As an initial step, preceding the actual measurements, the UE searches for and detects the candidate/target cell using specific physical layer channels defined for this purpose (and known as SCH). As part of this search process, the UE is able to determine the boundaries of the radio frames in the target cell (i.e. the boundaries of the frames of the sequence of frames in the defined format for the base station of the target cell). A UE typically starts communication in an E-UTRA cell using the random access procedure, which involves an initial transmission on the Random Access Channel (RACH). E-UTRA uses a radio frame format in which radio frames have a duration of 10 ms, and are numbered by means of the System Frame Number (SFN). This SFN is indicated on the primary broadcast channel (P-BCH) (or simply the broadcast channel BCH), i.e. the SFN information of the particular base station is contained in signals transmitted from the base station on the P-BCH/BCH. To perform the initial transmission on the RACH, the UE needs to be aware of the SFN timing of the concerned cell (the target base station). This is needed for the following reasons:

Firstly, the UE needs the target SFN timing information to find the RACH slots (i.e. determine the time slots in the target base station's frame format in which the UE may transmit its RACH signal; if it does not transmit in the correct slot or slots, communication with the base station will not be set up). For the frequency division duplex (FDD) mode of operation, the interval between RACH slots in UTRA/E-UTRA formats can be as follows: 1, 2, 5, 10, or 20 ms. If the target cell is arranged to apply an interval of 20 ms (which means that a RACH slot occurs not in every frame, but in every other frame) the UE needs to know the least significant bit of the SFN to be able to find the RACH. In other words, if the UE knows from other frame format information provided to it in a handover signal, for example, that RACH slots occur only in evenly numbered frames, the UE then must be able to determine the least significant bit of the SFN in binary form of a particular frame in order to transmit a RACH signal at an appropriate time.

Secondly, the UE needs the target SFN timing information to know the time frequency resources when hopping is used for RACH. In certain systems frequency hopping techniques are used such that the RACH signal frequency hops in time according to a particular pattern. In UTRA/E-UTRA systems the RACH preamble frequency hopping period can either be 10 or 40 ms. Thus, in the former case the RACH frequency changes every frame, whilst in the latter case, the RACH frequency changes every four frames. If the target cell applies a 40 ms hopping period, the UE therefore needs to know the two least significant bits of the SFN to be able to determine the frames in which RACH frequency changes, so that it can correctly access the RACH (i.e. send a RACH signal, using the appropriate frequency, at the appropriate time).

The SFN may be needed for other reasons as well, or alternatively (e.g. where resource allocation is SFN dependent) as discussed above.

Thus, when a handover from one base station to another is required (or when communication between the UE and target base station is required for some other purpose) the UE, synchronised with the source base station, needs the SFN and timing information of the target so that it can initiate communication with the target.

One mechanism by which the UE can determine the SFN and timing information of the target cell is for the UE to read the PBCH or BCH of the target cell (base station). The UE can then implicitly determine the two least significant bits of the SFN from decoding the BCH, and can detect frame edges. The BCH is repeated every 40 ms, meaning that it takes on average 20 ms to receive the BCH, i.e. on average it will take 20 ms before the UE can determine the target SFN timing information it requires to begin communication with the target (by sending a RACH signal). BCH reading delay therefore increases the handover interruption time. Currently there are no other reasons for the UE to receive the BCH prior to accessing the target cell's RACH. All other information the UE requires to access the target cell is assumed to be semi-static, so it can be provided to the UE in the handover command that the target eNB generates and transfers to the UE via the source eNB, i.e. prior to the actual handover. This way, there is no need for the UE to read system information from the target cell.

It is an object of certain embodiments of the present invention to provide communication systems and methods which obviate or mitigate at least one of the problems associated with the prior art. It is an object of certain embodiments to provide communication systems and methods offering improved handover (e.g. faster and/or to reduce service interruption).

DISCLOSURE OF INVENTION

Technical Solution

According to a first aspect of the invention there is provided a communication method in a communication system comprising mobile user equipment and a communication network adapted to communicate with the user equipment, the communication network comprising: a first base station adapted to communicate with the user equipment using radio signals and according to a first defined radio frame format comprising a first sequence of radio frames each having the same length and each being allocated a respective first system frame number (SFN) such that the radio frames of the first sequence are sequentially numbered; and a second base station adapted to communicate with the user equipment using radio signals and according to a second defined radio frame format comprising a second sequence of radio frames each having the same length and each being allocated a respective second SFN such that the radio frames of the second sequence are sequentially numbered, the length of the radio frames of one of the first and second formats being an integer multiple of the length of the radio frames of the other format, the method comprising:

receiving radio signals from the first base station at the user equipment and using said received signals to synchronise the user equipment with the first sequence of numbered radio frames, such that the user equipment can transmit radio signals to the first base station in accordance with the first defined radio frame format, and to determine the first SFN of a frame of the first sequence at a particular time, transmitting a radio signal to the user equipment from the communication network, the radio signal comprising first information indicative of a difference between the first and second SFNs at a particular time and second information usable with said first information to determine unambiguously at least a least significant bit of the SFN in binary form of a frame of the second sequence at a particular time from a knowledge of the SFN of a frame of the first sequence at a particular time, receiving said radio signal at the user equipment when synchronised with said first sequence, and using the first and second information to synchronise the user equipment with the second sequence, such that the user equipment can transmit radio signals to the second base station in accordance with the second defined radio frame format.

In certain embodiments the "integer" of the integer multiple is one, such that the frames of the first format have the same length as those of the second format. In alternative embodiments, the integer may be greater than one, with the first format frame length being greater than that of the second format, or vice versa.

The radio signal in certain embodiments is transmitted in accordance with the first format, from the first base station, to the synchronised UE (i.e. synchronised with the first format).

Thus, the communication network itself provides information to the UE which enables the UE to synchronise with the second radio frame format (in the sense that it is able to transmit one or more signals, for example a RACH signal, in accordance with that format) without the UE first having to read a signal such as a P-BCH signal from the second (i.e. target) base station. This saves time and/or reduces interruption in service; the UE can synchronise with the target base station from the received information and transmit a signal to the target base station in the next available slot, the UE having been able to determine the position of that next available slot from (using) the received information.

As will be appreciated, the radio frame formats of the first (source) and second (target) base stations will in general not be synchronised (their edges will not occur at precisely the same time), and so the first information alone is insufficient to identify unambiguously the SFN of a frame of the second sequence at a particular time from the SFN of a frame of the first sequence at a particular time; the instantaneous difference in frame numbers will alternate between two values with time. However, the second information is arranged to enable this ambiguity to be removed. The second information can be regarded as providing information on how the first information (indicative of a simple numerical difference in frame numbers) is to be applied; in effect, it tells the UE between which of the source and target frames that difference is to be applied.

In certain embodiments, the method further comprises transmitting a radio signal from the user equipment to the second base station in accordance with the second defined radio frame format (i.e. after the UE has synchronised with the second base station). For example, the communication network may be a UTRA or an E-UTRA network, or a hybrid network comprising UTRA and/or E-UTRA and/or other network devices, and the step of transmitting a radio signal from the user equipment to the second base station may comprise transmitting a RACH signal to the second base station to begin communication with that station. This may form part of a handover procedure, from the source to the target base station, and the method may then comprise continuing communication between the target base station and user equipment, after transmitting the radio signal from the UE to the target base station, by exchanging radio signals in accordance with the second defined format. In certain embodiments the second base station is an enhanced node B (eNB). The first base station may also be an eNB, or may be another form of base station. In other words, in certain embodiments the SFN information discussed above (and in the following description) is relevant for when a UE performs handover to an E-UTRA cell. This is irrespective of whether the source cell is using the E-UTRA radio technology or another radio access technology (RAT) e.g. GSM. If the SFN information is provided by the target eNB, this enables handover to be performed in the inter-RAT case (where the source and target cells use different RATs) provided the network synchronisation solution is able to cover the particular source cell RAT and provided also that the source and target RATs employ radio frame formats with frames of the same RF duration, e.g. 10 ms, or durations which have a defined relationship to one another (with one being an integer multiple of the other).

Thus, in certain embodiments the target cell is an E-UTRA cell, since for this type of cell we currently clearly need the SFN information. Embodiments of the invention may involve other RATs, for example where the other RATs act as source cells. Thus, the first base station may be an E-UTRA device or a non-E-UTRA device, according to the particular embodiment.

After establishing communication with the second base station the method may then comprise ceasing communication between the first base station and user equipment. This would constitute a complete handover. In alternative embodiments, however, it may be desirable to maintain communication with the first base station, with the UE synchronised with both the first and second formats, in the sense that it is able to send signals at appropriate times to either base station. As further information, if the UE is capable of dual operation (i.e. can carry out communication with both the source and target at the same time) the UE would normally be able to receive the BCH of the target cell prior to performing the handover, i.e. the measurements normally take sufficient time. For such cases, there would normally be no reduction in service interruption. In other words, embodiments of the invention are particularly applicable to single transceiver operation.

In certain embodiments, the method further comprises determining said first information in the communication network from signals received from the first and second base stations. For example, the first and second base stations may be eNBs of a UTRAN, that UTRAN also comprising a radio network controller (RNC) connected (wirelessly or otherwise) to the eNBs and able to communicate with them. The RNC may be arranged to determine a SFN difference (which may also be referred to as an SFN offset) from signals received from the two eNBS. In alternative embodiments, one of the base stations may be able to determine the SFN offset value from its own radio frame format and from a signal received from the other base station.

In certain embodiments the method further comprises determining a time difference between radio frame boundaries of the first and second sequence, and using the time difference together with an estimate of an accuracy of the time difference to determine said second information. The step of determining a time difference may also be described as estimating a time difference, for example from system measurements. In certain embodiments the time difference referred to above is an indication of the difference between the time at which a frame of one of the frame formats begins and the time at which the next frame in the other format begins. This estimated time difference may also be referred to as a frame edge offset, or a radio frame transmission timing difference.

In certain embodiments, the method further comprises determining the second information according to the relative magnitudes of the time difference and the estimate of accuracy.

For example, in certain embodiments the method comprises determining the second information to indicate that the difference between SFNs applies between a particular frame of the first sequence and the frame of the second sequence having a start time closest to that of the particular frame (whether that start time of the frame of the second sequence occurs before of after the start time of that particular frame of the first sequence) in the event that the magnitude of the time difference is less than the magnitude of the estimate of accuracy.

The method may also comprise determining the second information to indicate that the difference between SFNs applies between a particular frame of the first sequence and the frame of the second sequence having a start time within that particular frame, in the event that the magnitude of the time difference is greater than the magnitude of the estimate of accuracy.

In certain embodiments, determining the time difference comprises using a timing/synchronisation protocol. Certain embodiments use the Network Time Protocol (NTP) to determine/estimate the time difference between the frame edges in the different formats.

In certain embodiments, the estimate of accuracy is a fixed, predetermined value (for example selected on the basis of certain assumptions). In other embodiments, however, the method comprises the step of determining the estimate of accuracy, for example from system signals and/or system measurements. For example, the inaccuracy in a frame timing difference value obtained by using a protocol like NTP will largely depend on the jitter in the transport network between the two eNBs. It should be possible for an operator to deploy the infrastructure to the eNBs with relatively limited jitter (in an operator control network environment), i.e. it should be possible for an operator to realise a network deployment with sufficiently low jitter so that e.g. NTP would result in sufficiently accurate results. As to whether a protocol like NTP would itself be able to make some estimate of the inaccuracy, to some extent this should be possible; an accurate time difference estimate is obtained by longer term averaging of the measured results. If the node performing the measurement detects a lot of difference between the different individually measured results, it may conclude that the jitter is quite high and thus the accuracy of the estimate is not good. Thus, NTP may be used in embodiments of the invention to provide an estimated time difference, and may additionally be used to provide an indication of the accuracy of the estimated value.

In certain embodiments the second information is usable with the first information to determine unambiguously at least two least significant bits of the SFN in binary form of a frame of the second sequence at a particular time from a knowledge of the SFN of a frame of the first sequence at a particular time.

In certain embodiments the second information is usable with the first information to determine unambiguously the full SFN of a frame of the second sequence at a particular time from a knowledge of the SFN of a frame of the first sequence at a particular time.

In certain embodiments, the step of transmitting a radio signal (comprising the first and second information) to the user equipment from the communication network comprises transmitting the radio signal from the first base station. Thus, the transmitted signal will be in the first defined frame format (with which the UE is synchronised). The UE can thus quickly use the information on the received signal to synchronise with the second format and begin sending signals for reception by the second base station.

In certain embodiments the radio signal comprising the first and second information further comprises additional information indicative of frame structure in said second defined radio frame format. This can be used by the UE in conjunction with the first and second information to enable the UE to transmit signals in appropriate time slots to the second base station, and for example at the appropriate frequencies (the additional information in general may comprise other information that the UE requires to be able to carry out communication with the second base station, such as frequencies, hopping intervals, configuration information etc.).

A second aspect of the invention provides a communication system comprising:

mobile user equipment; and a communication network adapted to communicate with the user equipment, the communication network comprising:

a first base station adapted to communicate with the user equipment using radio signals and according to a first defined radio frame format comprising a first sequence of radio frames each having the same length and each being allocated a respective first system frame number (SFN) such that the radio frames of the first sequence are sequentially numbered; and a second base station adapted to communicate with the user equipment using radio signals and according to a second defined radio frame format comprising a second sequence of radio frames each having the same length and each being allocated a respective second SFN such that the radio frames of the second sequence are sequentially numbered, the length of the radio frames of one of the first and second formats being an integer multiple of the length of the radio frames of the other format, the user equipment being adapted to receive radio signals from the first base station and to use said received signals to synchronise with the first sequence of numbered radio frames, such that the user equipment can transmit radio signals to the first base station in accordance with the first defined radio frame format, and determine the first SFN of a frame of the first sequence at a particular time, the communication network being further adapted to transmit a radio signal to the user equipment, the radio signal comprising first information indicative of a difference between the first and second SFNs at a particular time and second information usable with said first information to determine unambiguously at least a least significant bit of the SFN in binary form of a frame of the second sequence at a particular time from a knowledge of the SFN of a frame of the first sequence at a particular time, the user equipment being further adapted to receive said radio signal and, when synchronised with said first sequence, to use the first and second information to synchronise with the second sequence, such that the user equipment can transmit radio signals to the second base station in accordance with the second defined radio frame format.

Again, the integer in certain embodiments is one, but in alternative embodiments may be greater than one.

Advantages associated with this second aspect will be apparent from the above discussion of the first aspect.

In certain embodiments the second base station is an eNB.

In certain embodiments the user equipment is further adapted to transmit a RACH signal to the eNB in accordance with the second defined radio frame format when synchronised with said second sequence In certain embodiments the first and second base stations are first and second eNBs respectively (e.g. forming part of an E-UTRA network) and the user equipment is further adapted to transmit a measurement report to the first eNB, the first eNB is responsive to the measurement report to send a handover request to the second eNB, the second eNB is responsive to the handover request to send a handover request acknowledgement to the first eNB comprising said first and second information, the first eNB is responsive to the handover request acknowledgement to transmit said radio signal comprising first and second information to the user equipment, and the user equipment is then arranged to send a RACH message to the second eNB. Thus, the system may be arranged to perform a handover.

In certain embodiments the communication network is arranged to determine a time difference between radio frame boundaries of the first and second sequence, and to determine said second information according to said time difference together and an estimate of an accuracy of said time difference. For example, in certain embodiments the communication network is adapted to determine said second information according to the relative magnitudes of said time difference and said estimate of accuracy.

In certain embodiments the communication network is arranged to determine said time difference using the NTP, and may be further adapted to determine said estimate of accuracy using the NTP.

In certain embodiments the second information is usable with said first information to determine unambiguously at least two least significant bits of the SFN in binary form of a frame of the second sequence at a particular time from a knowledge of the SFN of a frame of the first sequence at a particular time, and in certain embodiments may be usable to determine the full SFN.

In certain embodiments the communication network is adapted to transmit said radio signal to the user equipment from the first base station.

Another aspect of the invention provides user equipment adapted for operation in a communication system in accordance with the second aspect.

Another aspect provides a communication network adapted for operation in a communication system in accordance with the first aspect.

BRIEF DESCRIPTION OF THE DRAWINGS

Embodiments of the invention will now be described with reference to the accompanying drawings, of which.

MODE FOR THE INVENTION

Figure 1:
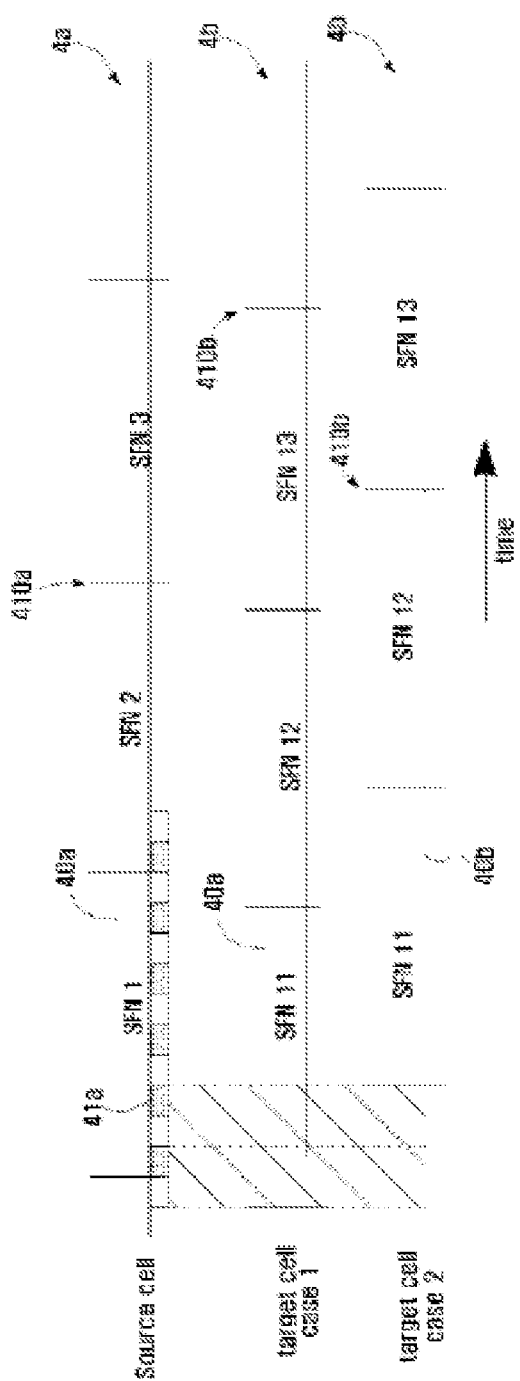
FIG. 1 is a diagram illustrating the timing and SFN differences between radio frame formats of two different base stations in an embodiment of the invention.

From the following description it will be appreciated that methods embodying the invention can generally be described as providing SFN offset signalling. Certain embodiments are applicable to Universal Terrestrial Radio Access (UTRA), and Evolved Universal Terrestrial Radio Access (E-UTRA) Networks, and avoid the need for the UE to read the P-BCH or BCH prior to accessing a neighbouring cell, which, for UEs in connected mode, reduces the handover interruption (for example by ~15 ms).

Certain embodiments of the invention use a signalling mechanism by which the network can indicate to the UE the SFN applicable for a radio frame in a target neighbouring cell by reference to a radio frame in the source cell. According to this signalling mechanism employed by embodiments, the network provides the UE with first information (a number) indicating a difference in SFN between the source and target cell (in other words, between the first base station's frame format and the second base station's frame format), i.e. an SFN offset. The network also provides second information which indicates a method that the UE shall apply to determine between which radio frames in the source and target cell the SFN offset applies.

The following features of embodiments of the invention will become apparent from the description below: the methods the UE shall use to determine between which radio frames in the source and target cell the SFN offset applies; the rules by which the E-UTRAN shall determine which method is appropriate; the associated signalling.

In certain embodiments of the invention the communication system comprises a E-UTRAN which is arranged to indicate, to a UE, an offset between the SFN used in a serving cell (i.e. a source cell, covered by a first base station using a first frame format) and a target cell (covered by a second base station using a second frame format). The advantage of this approach is that the UE is not required to receive a P-BCH or BCH signal from the target base station/cell before accessing that target cell. However, it should be noted that in general E-UTRA cells are not synchronised, and it is not sufficient for the network to provide just an offset value to the UE; that information alone does not enable the UE to correctly synchronise with the target cell's frame format. Further timing information is required, and embodiments of the invention obtain that information and provide it to the UE as follows.

There are a number of methods or protocols usable to provide the network timing information required in embodiments of the invention. One of these protocols is the Network Timing Protocol (NTP). NTP can be used to enable a client A, which has no perfect clock, to tune to a reference clock running at Server B (see for example http://www.ntp.org/ntpfaq/NTP-s-algo.htm). Using NTP it is possible to estimate time differences with an accuracy of a few ms in an operator controlled environment, as used in cellular communication networks.

Thus, certain embodiments of the invention use a network timing solution, e.g. NTP, to provide a source base station (e.g. a first eNB) with the SFN timing of the target cell's eNB, or vice versa, with some inaccuracy. A reasonable assumption of this inaccuracy is +/−2 ms, and this value will be used in certain examples discussed below. However, it will be appreciated that other estimated values may be appropriate in other circumstances. Furthermore, in certain embodiments the network may be able to obtain a measure of this inaccuracy, and use the measured value instead of an assumed one.

Again, It should be noted that the network nodes in embodiments of the invention are assumed not to be synchronised i.e. there is a time difference that is drifting slowly. Note also that the network timing solution is a continuously ongoing process i.e. there is no need, in certain embodiments, to perform timing related actions upon handover preparation/execution.

In the description below the following terms are used:

Estimated RF time difference (ETD): time difference between the radio frame boundaries in the source and target cell (i.e. in the source and target radio frame formats), estimated based on a network timing solution e.g. NTP Estimated RF time difference inaccuracy (ETDi): inaccuracy in the ETD. Clearly, this value is a "worst case" figure, and the actual time difference will in general be within the ETDi of the ETD.

This following description addresses the question how the SFN timing/offset information should be conveyed to the UE. The SFN timing/offset information in certain embodiments comprises two elements:

1) first information: an SFN offset i.e the number that the UE should add to the SFN detected in a radio frame in the source cell to obtain the SFN applicable for a radio frame in the target cell 2) second information: a Reference Frames Identification (RFI) method that the UE should apply to determine between which radio frames in the source and target cell the SFN offset applies.

In the following we will show that it is not possible for the UE to apply a single RFI method. In fact, the UE has to apply one of the following methods to identify the reference radio frames:

a) the SFN offset is applicable between the radio frame in the source and the radio frame in the target which start is closest to the start of radio frame in the source b) the SFN offset is applicable between the radio frame in the source and the radio frame in the target which start occurs within the radio frame in the source Which RFI method applies depends on the estimated RF time difference as well as the inaccuracy in this. Since only the E-UTRAN is aware of this (not the UE), the E-UTRAN has to signal to the UE which RFI method it should apply. In the following the two RFI methods are explained in more detail, as well as the E-UTRAN rule regarding when to apply which signalling option.

In the following description of certain embodiments, it is assumed that the target eNB provides the SFN timing information, because it is the target eNB that compiles the entire handover message in these examples. However, the mechanism could equally well be applied such that the source eNB provides the SFN timing/offset information to the UE in other embodiments.

As mentioned above, under certain circumstances the second information will indicate that the SFN offset is applicable between radio frames whose start times are closest. This signalling option is explained by means of an example:

Consider the situation where Estimated RF time difference (ETD)=1 ms (target cell radio frame starts 1 ms later than source cell)

Consider ETD inaccuracy (ETDi)=±2 ms

This means that the radio frame in the target cell could start 1 ms before that of source cell (case 1), it could start 3 ms after that of the source cell (case 2) or could start anywhere (i.e. any time) in-between.

FIG. 1 illustrates the example, showing the target cell timing for the two extreme cases, referred to as case 1 & case 2 in the previous paragraph. In this figure, 4a represents the sequence of numbered frames in time according to the defined radio frame format of the source cell, i.e. the radio frame format with which the user equipment can communicate with the base station for that cell. This sequence 4a comprises a series of radio frames 40a, which themselves have structure and are divided into time slots 41a. The frames 40a are sequentially numbered with system frame numbers (SFN1, SFN2 etc). In this particular format there are no gaps in the frame sequence, with the frame boundaries marking the end of one frame and the beginning of the next frame being indicated by reference number 410a. Also in the figure the sequences of frames for the target cell (i.e. in accordance with the defined radio frame format of the base station for the target cell) are denoted by reference number 4b. As will be seen, the frames of the source and target cell all have the same approximate length (i.e. duration) but the source and target cells are not synchronised so that there is an offset in the positions of the frame boundaries 410a and 410b.

In this example, the hatched box marks the range of possible target cell timings. All these timing options have one characteristic in common: the start of the radio frame (RF) with SFN 11 in the target cell is closest to the start of the radio frame with SFN 1 in the source cell In other words, the SFN difference between the radio frames in the target and source whose start times are closest equals +10 (i.e. SFN-target is 10 higher than SFN-source)

Hence, in this case the E-UTRAN would indicate:

SFN offset=+10 (SFN of radio frame in target is 10 higher than in source cell)

RFI method=A) i.e. the SFN offset applies between the radio frames whose start times are closest.

Consider now the offset applicable for the target RF starting within the source RF. This signalling option is again explained by means of an example:

Consider the case where Estimated RF time difference (ETD)=4 ms (target cell radio frame starts 1 ms later than source cell)

Consider ETD inaccuracy (ETDi)=±2 ms

This means that the radio frame in the target cell could start 2 ms after that of the source cell (case 1), it could start 6 ms after that of the source cell (case 2) or could start anywhere in-between.

Figure 2:
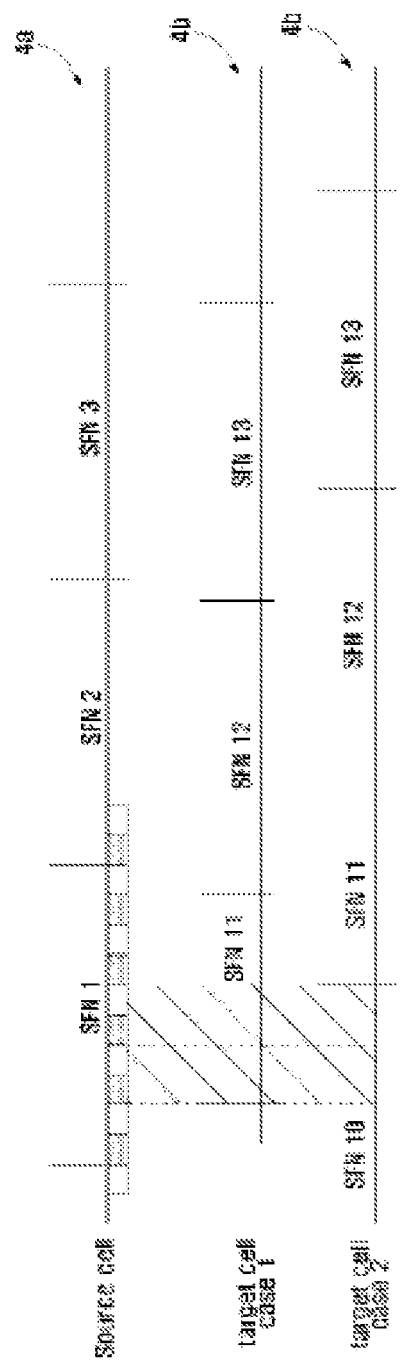
FIG. 2 is another diagram illustrating the timing and SFN differences between radio frame formats of two different base stations in an embodiment of the invention.

FIG. 2 illustrates the example, showing the target cell timing for the two extreme cases, referred to as case 1 & case 2 in the previous paragraph. In this example, the hatched box marks the range of possible target cell timings.

All these timing options have one characteristic in common: the start of the radio frame with SFN 11 in the target cell is within the radio frame with SFN 1 in the source cell.

In other words, the start of the radio frame with SFN 11 in the target cell is after the start of the radio frame with SFN 1 in the source cell.

Hence, in this case the E-UTRAN would indicate:

SFN offset=+10 (SFN of radio frame in target is 10 higher than in source cell)

RFI method=B) i.e. the SFN offset applies between the radio frame in the source cell and the radio frame of the target cell whose start occurs within the source cell's radio frame starts (or in other words, the SFN offset applies between the radio frame in the source cell and the radio frame of the target cell whose start immediately follows the start of the source cell's radio frame).

In embodiments of the invention the network needs to decide which of the above methods should be signalled to the UE to enable correct synchronisation with the target base station/cell to be achieved. In embodiments utilising E-UTRAN, it is up to E-UTRAN to signal the correct SFN offset as well as the correct method (of applying that numerical offset) to the UE. Which method to apply depends on the Estimated RF time difference (ETD) and the inaccuracy in this estimate i.e. the ETDi.

Due to the 10 ms duration of a RF in UTRAN/E-UTRAN systems, the value range of ETD is from −5 ms to +5 ms.

The value range of the ETDi depends on the network timing mechanism that is implemented in the network. Let us describe the value range of ETDi=[−ϵ, +ϵ]. It should be noted that the network based solution can only work if ϵ is smaller than 5 ms.

Figure 3:
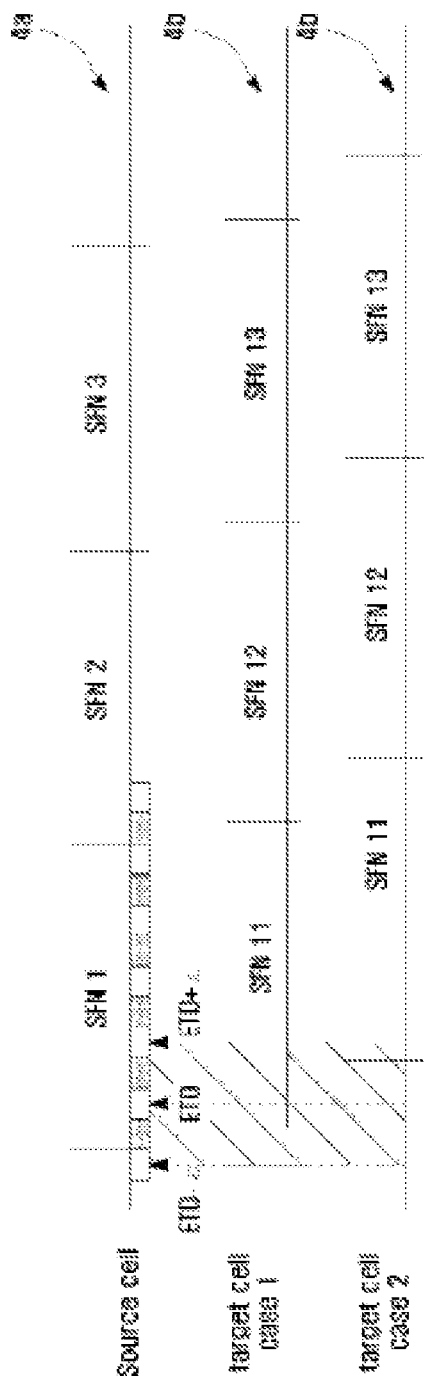
FIG. 3 is yet another diagram illustrating the timing and SFN differences between radio frame formats of two different base stations in an embodiment of the invention.

FIG. 3 illustrates that if ETD<ϵ, the start of the radio frame in the target cell may be prior to the start of the radio frame in the source cell. In such a case, method B (as referred to above) will not provide correct/consistent results.

Hence, the E-UTRAN should select the RFI method as follows:

If ETD≤ϵ (i.e. ETD−ϵ (the start of the target cell frame) might fall in the source radio frame, or the preceding source frame): method A should be used.

Else (ETD>ϵ): method B should be used.

In other words, where the relative magnitudes of estimated time difference and inaccuracy are such that there is uncertainty as to whether a target frame will begin in a particular source frame or in the preceding source frame, method A needs to be used. Alternatively, where the relative magnitudes indicate that the target frame will start somewhere within the source frame, method B should be used. Following these rules, ambiguity is removed and the UE can synchronise with the target cell using the first and second information provided by the network.

For completeness, we consider the possibility of the network being able to synchronise the network nodes (eNBs) in a manner such that the E-UTRAN would only need to provide the SFN offset to the UE in order for it to synchronise with the target cell/node. In such a hypothetical situation, there could be a timing difference between adjacent cells, but that timing difference would not be drifting. However, there would be some jitter (i.e. there would still be an ETDi). Further to this, the network synchronisation solution would have to ensure that there were no cells having an ETD that would require method A above.

Suppose that there is a small network based timing inaccuracy, say less than 1 ms. In such a case, E-UTRAN would have to ensure that the timing of all adjacent cells is at least 1 ms apart. This would require a network synchronisation master/coordinator to manage the timing of the cells. Clearly, this would represent a relatively complicated solution, requiring high accuracy, and hence is a solution that most networks would like to avoid.

Embodiments of the invention, by providing the first and second information, enable the UE to synchronise with the target base station even when timing differences and offsets are changing, so avoiding the need for accurate inter-node synchronisation and the associated costs/complexity.

It will be appreciated that embodiments of the invention provide a network based SFN solution which provides the advantage that the handover interruption is reduced significantly (without this solution, using for example the reading of the P-BCH method described in the background to the invention, the average interruption may double from ~15 to ~30 ms).

In order to achieve these advantages, in certain embodiments the (asynchronous) network needs to implement a network based timing mechanism. The signalling mechanism used in certain embodiments indicates an 'RFI-method' in addition to an offset value, to enable synchronisation to be achieved.

Figure 4:
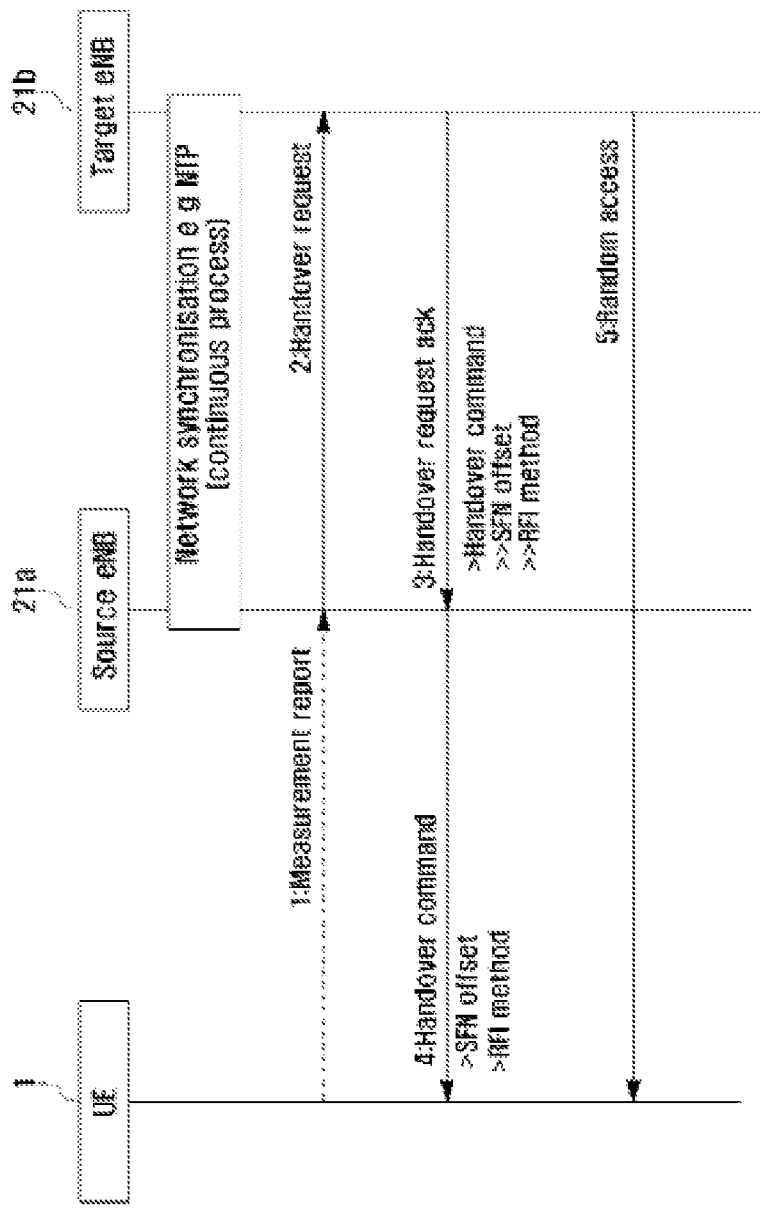
FIG. 4 is a diagram illustrating a handover message sequence in an embodiment of the invention.

Referring now to FIG. 4, this is a message sequence diagram showing the sequence of messages in a communication method (in particular a handover method) embodying the invention). The steps in this sequence are as follows:

0) A network based timing solution is used e.g. NTP. As a result of this network based timing solution the source and target eNB are always aware of the Estimated Time Difference between the two cells, as well as the inaccuracy, i.e. no specific timing actions need to be performed upon handover preparation/execution.

1) The UE 1 provides a measurement report which may suggest that it is desirable that the network triggers a handover to another cell, the target cell. This step is optional i.e. the source may also initiate handover without having received a measurement report (i.e. blind handover)

2) The source eNB 21a initiates handover by requesting the target eNB 21b to prepare for the handover e.g. to allocate radio resources.

3) The target cell compiles a handover command message that is to be sent to the UE via the source eNB. The handover command includes the SFN offset and the RFI method 4) The source eNB forwards the handover command received from the target cell to the UE 5) Upon receiving the handover command the UE initiates handover. The UE applies the SFN offset and the RFI method to determine the SFN of the radio frames in the target cell. Upon receiving the handover command, the UE initiates random access in the target cell. This random access is performed using the firstly occurring RACH slot in the target cell. The UE applies the SFN offset and the RFI method to find this RACH slots (in case the target cell applies one slot every 20 ms) and/or the time frequency resources used for this RACH slot (in case the target cell applies a hopping period of 40 ms)

As indicated in the above (see step 5), the SFN offset and the RFI method are needed depending on the RACH configuration in the target cell i.e. the information is optional to include in the concerned messages. Even if needed, the network could omit the information e.g. to avoid the complexity associated with the network based timing solution. The handover would still succeed, but the service interruption will be larger.

In the above example, the SFN offset information was provided by the target cell (i.e. by the target base station). However, it will be appreciated that in alternative embodiments the SFN offset information may be provided by the source cell (source base station).

Figure 5:
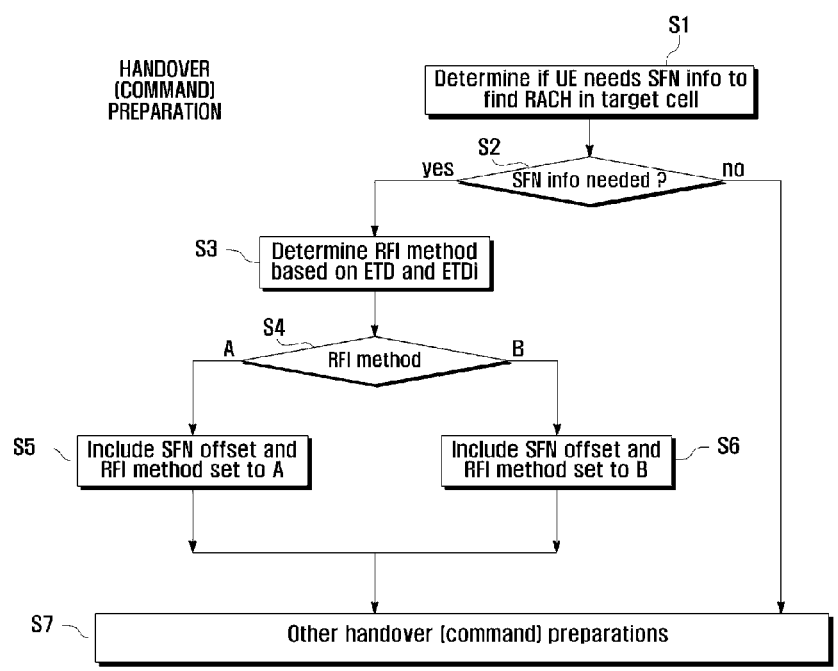
FIG. 5 is a flow diagram illustrating the operation of a base station (eNB) in a communication system and method embodying the invention.
Figure 6:
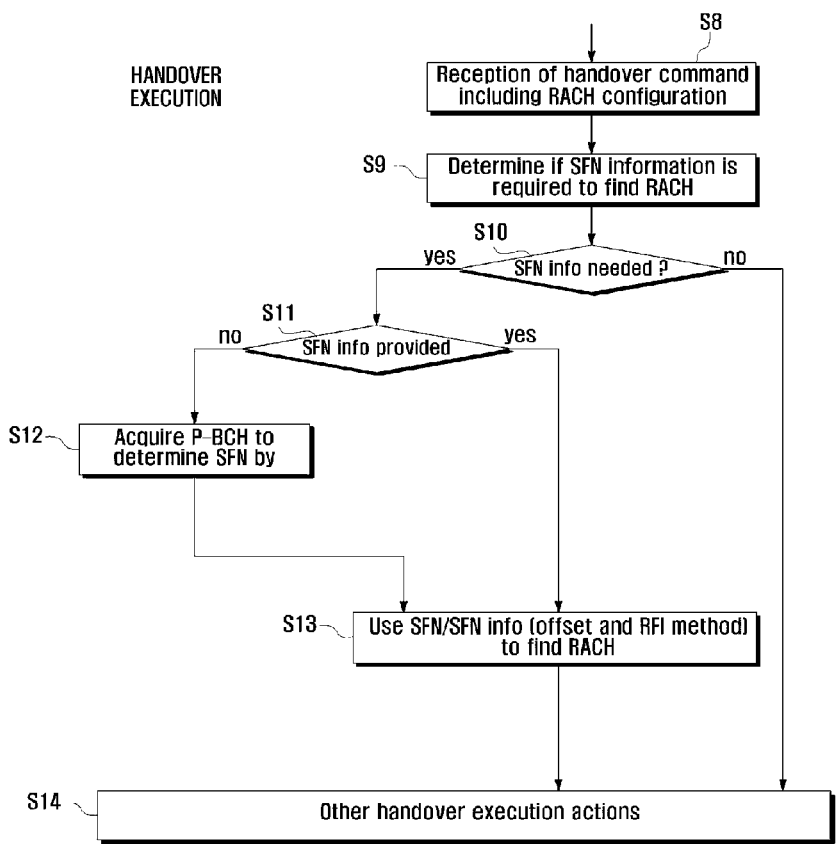
FIG. 6 is a flow diagram illustrating the operation of User Equipment (UE) in a communication system and method embodying the invention.

Referring now to FIGS. 5 and 6, these shows flow diagrams illustrating operation of an eNB and a UE in certain embodiments of the invention. In the method illustrated in FIG. 5, the eNB (which may be the base station of the target cell or the source cell) in step S1 determines if the UE will need SFN information in order to find the RACH in the target cell (SFN information will of course not be required if there is a RACH slot defined in each frame, but at least the least significant bit of the SFN will be required if RACH slots occur only in alternate frames, etc). In step S2 a decision is taken according to whether SFN information is needed. If that information is not needed the method proceeds to step S7 in which handover command preparations are performed. If SFN information is needed the method instead proceeds to step S3 in which the base station determines which RFI method it should use, based on the relative magnitudes of the ETD and ETDI. In step S4, if method B is appropriate then the flow is directed to step S6 in which the SFN offset value and information indicative that RFI method B should be used are included in the handover command being prepared by the base station. Alternatively, if it has been decided that method A is appropriate, then step S5 is performed in which the SFN offset and information indicating that RFI method A should be used are inserted in the handover command. Referring to FIG. 6, this shows the method steps performed by the UE on receipt of the handover message from the network (e.g. from the source base station or the target base station). In step S8 the UE receives the handover command which includes information on the RACH configuration of the target cell (base station). In step S9 the UE determines if SFN information is required in order to find a RACH slot (and perhaps additionally the RACH frequency). In step 10, if SFN information is not required the method is directed to step S14 in which handover execution is actioned. Alternatively if SFN information is needed then the flow proceeds to step S11 in which it is determined whether or not the SFN information has been provided. If appropriate SFN timing information has not been provided then the method proceeds to step S12 in which the UE acquires the P-BCH or BCH signal from the target cell to determine the SFN and timing information from the signals received on that channel. Alternatively, if step S11 determines that the appropriate SFN timing information has been provided, flow proceeds to step S13. In that step, the received SFN offset information and the other information (e.g. the RFI method information) which tells the UE how to use the SFN offset, are used to synchronise with the radio frame format of the target cell (in other words, to find a RACH slot in which the UE can send a signal to the target base station to initiate communication as part of the handover process). After step S13 the method then proceeds to step 14 in which other handover execution actions are performed.

Some further details on the operations indicated in the flow diagrams are as follows:

Determining if SFN information is needed to find RACH (eNB, UE): the SFN is needed in the event that the RACH configuration in the target cell meets the following criteria: one RACH slot is configured every 20 ms; or RACH hopping is used with a period of 40 ms.

RFI method selection (eNB). is selected as follows: select RFI method B IF ETD>$\epsilon$; select RFI method A otherwise.

Applying the RFI methods to determine the SFN in the target (UE): if using RFI method A, the SFN offset applies between the radio frames whose start times are closest; if using RFI method B, the SFN offset applies between the radio frame in the source cell and the radio frame of the target cell whose start occurs within the source cell's radio frame.

A handover message/command (RRC Connection Reconfiguration) used in embodiments of the invention may contain the following information (this message is used by eUTRAN to modify or release an RRC connection):

TABLE 1

Handover command contents

| Information Element/Group name | Need | Description |
| --- | --- | --- |
| Message Type | MP | |
| RRC transaction identifier | MP | |
| Measurement configuration | OP | |
| Mobility control information | OP | |
| >Target cell identity | MP | |
| >Carrier frequency | OC | |
| >Additional spectrum emission requirement | OC | |
| >Semi-static common channel configuration information | OP | |
| >End time dedicated preamble | OP | |
| >SFN information | OP | |
| >>SFN offset | MP | Number reflecting the difference in SFN timing between target and source |
| >>RFI method | MP | Method A or B |
| NAS dedicated information | OP | |
| Radio resource configuration | OP | |
| Security configuration | OP | |
| UE related information | OP | |
| Idle mode mobility control information | FFS | Optionally present in the message used to perform connection release. It is FFS if a message is introduced specific for connection release |

In the above table only the further details of the Mobility control information are shown since the other information elements are not essential for the purpose of under-standing the present invention. The abbreviations used in the above table are as follows:

TABLE 2

| Abbreviation | Meaning |
| --- | --- |
| MP | Mandatory present An information element that always needs to be signalled. If the transfer syntax allows absence (e.g. because the information concerns an extension), the UE shall consider this to be protocol error |
| OP | Optional An information element that is optional to signal. The UE behaviour that applies in case the IE is absent is specified in the procedural specification |

TABLE 2-continued

| Abbreviation | Meaning |
| --- | --- |
| OC | Optional, Continue An information element that is optional to signal. In case the information element is absent, the UE shall continue to use the existing value (and the associated functionality) |
| FFS | For Further Study |

Figure 7:
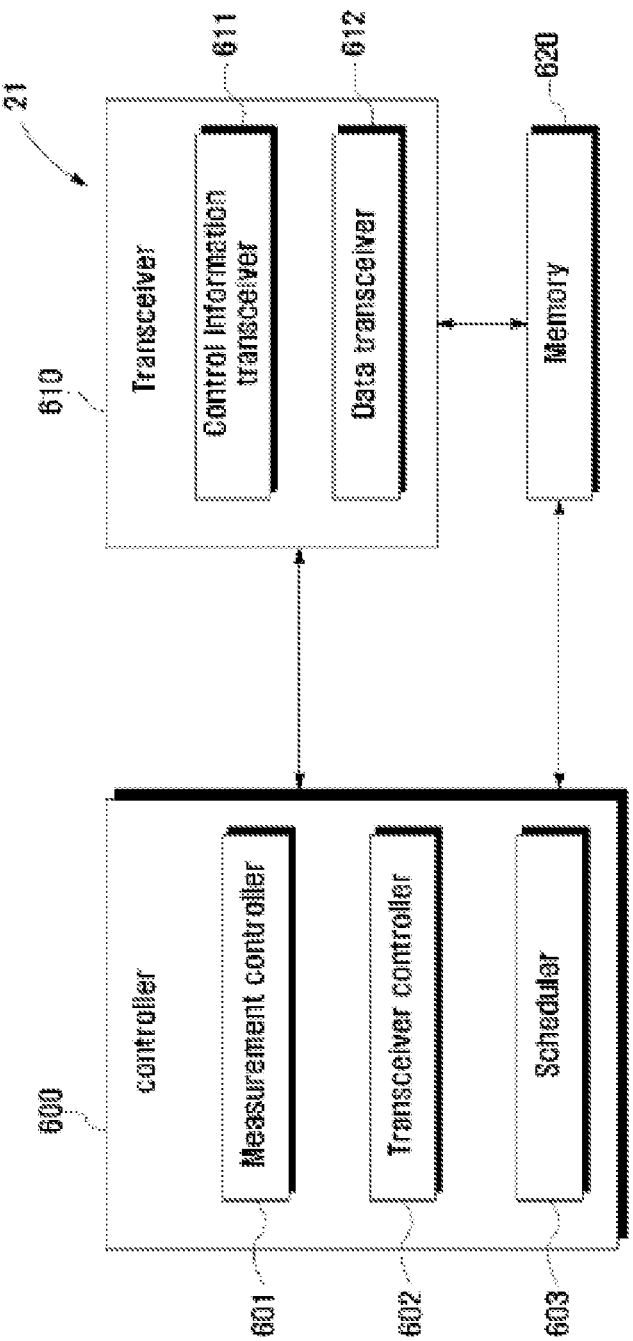
FIG. 7 is a block diagram illustrating the structure of an eNB usable in a communication system embodying the invention.
Figure 8:
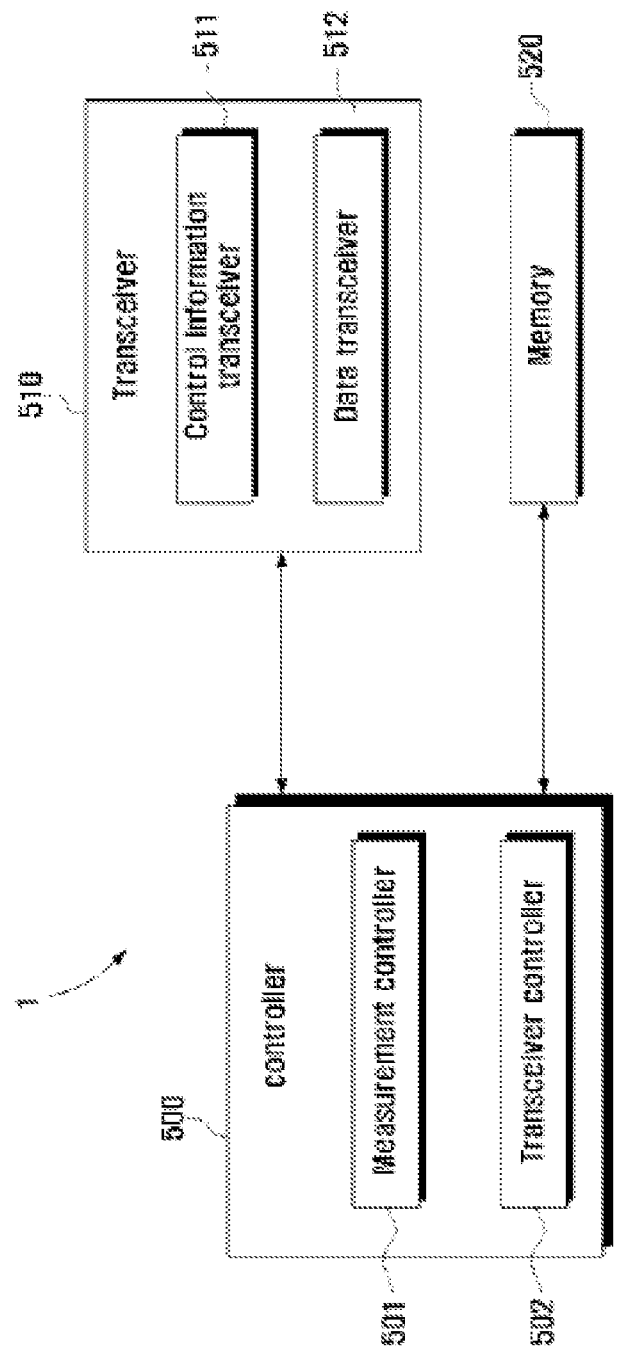
FIG. 8 is a block diagram illustrating the structure of User Equipment (UE) usable in a communication system embodying the invention.

Referring now to FIGS. 7 and 8, these are general block diagrams of an eNB and a UE respectively which may be used in communication systems and methods embodying the present invention. In general, the functionality required for these elements to operate in communication methods and systems embodying the invention is provided by appropriate programming of the transceiver controllers 602 and 502, the hardware being otherwise as in prior art systems. The eNB 21 comprises a controller module 600, a transceiver module 610 and a memory module 620. The controller 600 comprises a measurement controller 601, a transceiver controller 602 and a scheduler 603. The transceiver 610 comprises a control information transceiver 611 and a data transceiver 612. The UE1 comprises a controller module 500, a transceiver module 510 and a memory module 520. The controller 500 comprises a measurement controller 501 and a transceiver controller 502. The transceiver 510 comprises a control information transceiver 511 and a data transceiver 512.

The eNB 21 is adapted to communicate with user equipment using radio signals according to a defined radio format comprising a sequence of radio frames each having the same length and each being allocated a system frame number. This eNB 21 is further adapted to prepare and transmit a radio signal to user equipment in accordance with the defined radio frame format, that signal comprising first information indicative of a difference between the SFN at a particular time in the eNB's frame format and the SFN of another eNB's frame format at that time, together with second information which can be used by user equipment receiving the signal in conjunction with the first information to enable that UE to synchronise with the other, target base station. The eNB is arranged to determine the first and second information by communication within its network, e.g. by communicating with another eNB to determine the SFN offset information and the frame boundary timing information required to generate the second information.

Similarly, the UE 1 in FIG. 8 is adapted to be able to synchronise with a particular base station using signals received from that base station in its particular radio frame format. The UE is also adapted so that when it is synchronised with a particular base station format it can receive an appropriate signal containing first and second information (as described above), indicating an SFN offset value and how to use it, and can then synchronise with the radio frame format of another base station (of a target cell). When synchronised, it can send a communication-initiating signal (such as a RACH signal) at a time appropriate in the target cell frame format.

Figure 9:
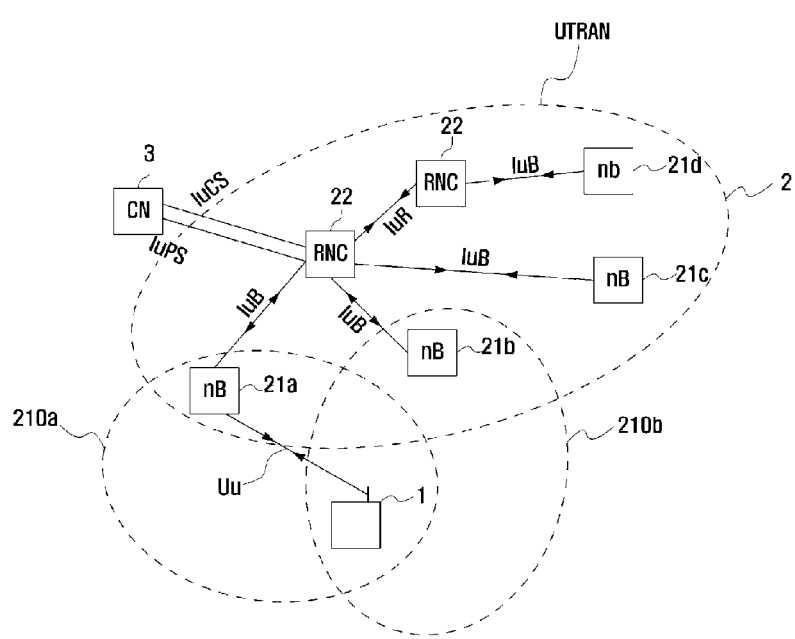
FIG. 9 is a schematic diagram of a communication system embodying the invention.

Referring now to FIG. 9, this shows a communication system embodying the invention. The system comprises mobile user equipment 1 in the form of a mobile phone, a cellular communications network 2, and a core network 3. In this example the cellular communications network 2 is a UTRAN network comprising a plurality of node Bs 21a, b, c, and d, and a plurality of radio network controllers RNC 22. Although in this example the network is a UTRAN network, in alternative embodiments the network may be a E-UTRAN network, in which case the base stations 21 would be ENBs.

Thus, the UTRAN 2 is arranged to provide connectivity between the UE 1 and the core network, and so enables the UE to be connected to other UEs (for example at remote locations) and to other devices and systems. The RNCs 22 provide control functions for one or more of the node Bs 21. The logical interface between the RNCs and the NBs, by which these devices communicate with one another, is referred to as the IuB. There are four interfaces connecting the UTRAN elements internally and externally to other entities, these four interfaces being known as Iu, Uu, Iub and Iur. The Iu interface is an external interface that connects the RNC to the core network 3. The Uu is also external, connecting the particular node B with the user equipment 1. The Iub is an internal interface connecting the RNC with the node B, and finally there is the Iur interface which is an internal interface most of the time, but can in certain conditions be an external interface. This Iur connects two RNCs with each other. In the figure, the coverage area or cell corresponding to a first node B 21a is denoted by 210a. This is the region within which the UE can communicate with the first node B 21a using radio signals according to the radio frame format appropriate to that base station 21a and its corresponding cell 210a. Similarly, the cell of a second node B 21b is indicated by reference number 210b. As can be seen, the UE1 is shown located in an area of overlap between the two coverage areas. The UE1 may synchronise with the first cell 210a (i.e. synchronise with the radio frame format of its node B 21a). Using techniques described above, the network 2 is arranged to send a radio signal to the UE1 containing first information indicative of a SFN offset value between the first cell 210a and second cell 210b and second information which can be used in conjunction with the first information by the UE1 to synchronise with the second cell 210b. Having received that information, the UE1 is then able to initiate communication with the second base station 21b and after that it may then drop communication with the first node B 21a as it moves from the overlap area into the area covered by the second base station 21b alone.

Figure 10:
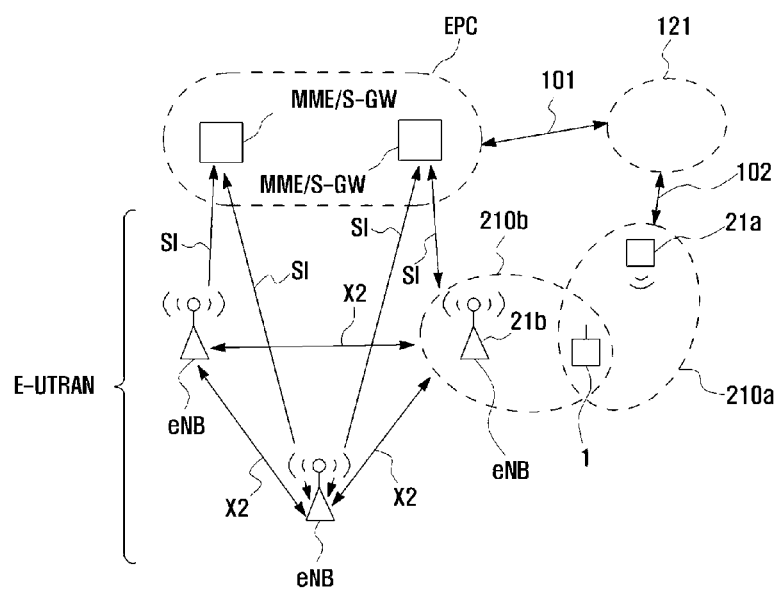
FIG. 10 is a schematic diagram of another communication system embodying the invention.

Referring now to FIG. 10, this shows another communication system embodying the invention. The system comprises a target cell 210b which is an E-UTRA cell in an E-UTRAN architecture, and a source cell 210a of a different (i.e. non-E-UTRAN) RAT. The source cell comprises a source base station 21a communicating with the user equipment 1, which is located in the overlap region of the source and target cells. The source cell 210a is connected to the source core network (a non-E-UTRAN RAT) 121 and this connection/interface is denoted generally by reference number 102. The E-UTRAN consists of eNBs, providing the E-UTRA user plane and control plane protocol terminations towards the UE 1. The eNBs are interconnected with each other by means of the X2 interface. The eNBs are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MMEs/Serving Gateways and eNBs. As mentioned above, in this example the source cell 210a is of another RAT, and there is a connection between the source and target cells at the level of the Core Networks i.e. the communication between the source RAT and the target cell in the U-UTRAN is via the EPC. The connection between the source core network 121 and the E-UTRAN core network is indicated by reference number 101. Thus, in certain embodiments the source base station (e.g. a node B, if the source RAT is UTRAN) is not directly connected to the EPC nodes but via another node in its own core network. It will also be appreciated that in certain embodiments there are many eNBs connected to an MME & to an SAE Gw.

Abbreviations

AS Access Stratum. All that extends from below NAS to the actual physical layer.
CN Core Network
eNB Enhanced Node B
ETD Estimated Time Difference
ETDi Estimated Time Difference inaccuracy
GMM GPRS Mobility Management
LA Location Area
LTE Long Term Evolution
MME Mobility Management Entity
NAS Non-Access Stratum. Commonly understood to extend above AS right up to the interface with the application level. Specifically it is what is given in 3GPP TS 24.008 encompassing the MM, GMM, CC, SMS, SM, SS.
RA Routing Area
RFI Reference frames identification
SAE System Architecture Evolution
SFN System Frame Number
SM Session management
TA Tracking Area
UMTS Universal Mobile Telecommunications System
E-UTRA Evolved Universal Terrestrial Radio Access
E-UTRAN Evolved Universal Terrestrial Radio Access Network
UPE User Plane Entity

INDUSTRIAL APPLICABILITY

With regard to applicability, it will be appreciated that certain methods embodying the invention are particularly applicable to systems comprising E-UTRA base stations and UEs in the form of mobile phones. The invention helps reduce service interruption for intra LTE handover. However, the use of a methods embodying the invention for other handover scenarios is not precluded. Furthermore, the present invention is applicable to other communication systems (it is not limited to UTRA or E-UTRA systems). Methods embodying the invention may be applicable in other networks where a mobile device needs to know the radio frame timing of a cell prior to cell access.

For the purpose of ease of elaboration and also for readers unfamiliar with terms and abbreviations within the 3GPP, some of the abbreviations and terms used in this document are provided here. It must be clearly noted and understood by readers that whilst every attempt has been made to have the terms and abbreviations used in this paper to be an exact match with those terms and abbreviations used in 3GPP, the terms and abbreviations here listed are strictly only for the purpose of use relating to this document.

What is claimed is:

1. A communication method of a terminal in a communication system, the method comprising:
receiving a handover command from a source base station, the handover command comprising a system frame number (SFN) offset for indicating a difference between an SFN of the source base station and an SFN of a target base station, and a reference frame identification (RFI) for determining which radio frame of the source base station and the target base station the SFN offset applies to;
synchronizing with the target base station based on the SFN offset and the RFI; and
initiating random access with the target base station.

2. The method of claim 1, wherein the SFN offset is determined in an upper node of the source base station.

3. The method of claim 2, wherein the upper node determines the SFN offset using signals received from the source base station and the target base station.

4. The method of claim 1, wherein the RFI includes at least one least significant bit of an SFN of the target base station and an SFN of the source base station.

5. The method of claim 1, wherein the RFI is determined using a time difference between radio frame boundaries of the source base station and the target base station together with an estimation of accuracy of the time difference.

6. The method of claim 5, wherein the RFI is determined according to a relative magnitude of the time difference and the estimate of accuracy.

7. The method of claim 5, wherein the time difference is determined using a network time protocol (NTP).

8. The method of claim 1, further comprising receiving additional information indicating frame structure of the target base station.

9. A terminal in a communication system configured to:
receive a handover command from a source base station, the handover command comprising a system frame number (SFN) offset for indicating a difference between an SFN of the source base station and an SFN of a target base station, and a reference frame identification (RFI) for determining which radio frame of the source base station and the target base station the SFN offset applies to;
synchronize with the target base station using the SFN offset and the RFI; and
initiate random access with the target base station.

10. The terminal of claim 9, wherein the SFN offset is determined in an upper node of the source base station.

11. The terminal of claim 10, wherein the upper node determines the SFN offset using signals received from the source base station and the target base station.

12. The terminal of claim 9, wherein the RFI includes at least one least significant bit of an SFN of the target base station and an SFN of the source base station.

13. The terminal of claim 9, wherein the RFI is determined using a time difference between radio frame boundaries of the source base station and the target base station together with an estimation of accuracy of the time difference.

14. The terminal of claim 13, wherein the RFI is determined according to a relative magnitude of the time difference and the estimate of accuracy.

15. The terminal of claim 13, wherein the time difference is determined using a network time protocol (NTP).

16. The terminal of claim 9, wherein the terminal is further configured to receive additional information indicating frame structure of the target base station.

* * * * *